US012552952B2

(12) United States Patent
Kaji et al.

(10) Patent No.: US 12,552,952 B2
(45) Date of Patent: Feb. 17, 2026

(54) INKJET INK, INKJET RECORDING METHOD, INK SET, INK MEDIUM SET, AND PRINT MEDIUM

(71) Applicant: Nippon Kayaku Kabushiki Kaisha, Tokyo (JP)

(72) Inventors: Yuki Kaji, Tokyo (JP); Aiko Matsumura, Tokyo (JP); Keishiro Yoshida, Tokyo (JP); Shunta Misawa, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 235 days.

(21) Appl. No.: 18/552,562

(22) PCT Filed: Mar. 30, 2022

(86) PCT No.: PCT/JP2022/016357
§ 371 (c)(1),
(2) Date: Sep. 26, 2023

(87) PCT Pub. No.: WO2022/224786
PCT Pub. Date: Oct. 27, 2022

(65) Prior Publication Data
US 2024/0191093 A1  Jun. 13, 2024

(30) Foreign Application Priority Data

Apr. 19, 2021 (JP) ................... 2021-070175

(51) Int. Cl.
| | |
|---|---|
| *C09D 11/38* | (2014.01) |
| *B41J 2/01* | (2006.01) |
| *B41J 2/18* | (2006.01) |
| *B41J 2/21* | (2006.01) |
| *B41M 5/00* | (2006.01) |
| *C09D 11/322* | (2014.01) |
| *C09D 11/328* | (2014.01) |
| *C09D 11/40* | (2014.01) |
| *C09D 11/54* | (2014.01) |

(52) U.S. Cl.
CPC .......... *C09D 11/38* (2013.01); *B41J 2/01* (2013.01); *B41J 2/18* (2013.01); *B41J 2/2107* (2013.01); *B41M 5/0047* (2013.01); *B41M 5/0064* (2013.01); *C09D 11/322* (2013.01); *C09D 11/328* (2013.01); *C09D 11/40* (2013.01); *C09D 11/54* (2013.01)

(58) Field of Classification Search
CPC ........ B41J 2/2107; B41J 2/01; B41J 2/14201; B41J 2/48; B41J 3/407; B41J 11/002; B41J 11/00214; B41J 11/00244; B41J 2202/20; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/045; B41J 11/0015; B41J 2/04581; B41J 2/055; B41J 2/16538; B41J 2002/16502; B41M 5/0023; B41M 5/0011; B41M 5/0017; B41M 5/0047; B41M 7/00; B41M 7/0072; B41M 5/52; B41M 5/5218; B41M 5/5227; C09D 11/101; C09D 11/30; C09D 11/322; C09D 11/326; C09D 11/34; C09D 11/40; C09D 11/10; C09D 11/36; C09D 11/38; C09D 11/32; C09D 11/324; C09D 11/328; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 2011/0234728 A1 | 9/2011 | Aoki et al. | |
| 2013/0155143 A1* | 6/2013 | Ozawa | C09D 11/326 347/20 |
| 2013/0286084 A1 | 10/2013 | Aoyama et al. | |

(Continued)

FOREIGN PATENT DOCUMENTS

| | | |
|---|---|---|
| CN | 102233719 A | 11/2011 |
| CN | 103374251 A | 10/2013 |

(Continued)

OTHER PUBLICATIONS

Office Action issued in Chinese Patent Application No. 202280028175. 6, dated Mar. 27, 2025, in 15 pages.

(Continued)

*Primary Examiner* — Manish S Shah
(74) *Attorney, Agent, or Firm* — Knobbe, Martens, Olson & Bear, LLP

(57) ABSTRACT

An inkjet ink which contains a coloring agent, an organic compound excluding the coloring agent, and water, and in which the organic compound contains a compound a such as diethyleneglycol monohexyl ether, a compound b such as 1,8-octane diol, and a compound c such as 1,5-pentane diol, and relationships of (a)≤(c) and 0.1≤(c)/(b)≤50 are satisfied, when (a) represents, in parts by mass, the total contained amount of the compound a with respect to 100 parts by mass of the ink, (b) represents, in parts by mass, the total contained amount of the compound b with respect to 100 parts by mass of the ink, and (c) represents, in parts by mass, the total contained amount of the compound c with respect to 100 parts by mass of the ink.

9 Claims, No Drawings

(56) References Cited

U.S. PATENT DOCUMENTS

| | | | | |
|---|---|---|---|---|
| 2015/0116421 A1* | 4/2015 | Nonogaki | ............ | C09D 11/326 |
| | | | | 524/378 |
| 2015/0307729 A1* | 10/2015 | Gotou | .................... | C09D 11/38 |
| | | | | 106/31.77 |
| 2015/0353751 A1* | 12/2015 | Umebayashi | ........ | C09D 11/322 |
| | | | | 428/207 |
| 2015/0361282 A1* | 12/2015 | Nakagawa | ................. | B41J 2/01 |
| | | | | 428/207 |
| 2017/0088732 A1 | 3/2017 | Koganehira | | |
| 2017/0137652 A1 | 5/2017 | Iuchi et al. | | |
| 2018/0056691 A1* | 3/2018 | Arai | ..................... | C09D 11/322 |
| 2019/0284421 A1* | 9/2019 | Sekiguchi | .............. | C09D 11/38 |
| 2020/0048486 A1* | 2/2020 | Nio | ............................ | B41J 2/01 |
| 2022/0041877 A1 | 2/2022 | Sato et al. | | |

FOREIGN PATENT DOCUMENTS

| | | |
|---|---|---|
| JP | 2009-144006 A | 7/2009 |
| JP | 2013-124335 A | 6/2013 |
| JP | 2014-205783 A | 10/2014 |
| JP | 2016-160388 A | 9/2016 |
| JP | 2016-188328 A | 11/2016 |
| JP | 2017-066215 A | 4/2017 |
| JP | 2018-154118 A | 10/2018 |
| JP | 2020-055943 A | 4/2020 |
| JP | 2020-125382 A | 8/2020 |
| JP | 2021-127419 A | 9/2021 |

OTHER PUBLICATIONS

Extended European Search Report issued in European Patent Application No. 22791561.8, dated Apr. 2, 2025, in 10 pages.

Notice of Reasons for Rejection issued to JP Application No. 2022-555889, mailed Nov. 8, 2022.

* cited by examiner

INKJET INK, INKJET RECORDING METHOD, INK SET, INK MEDIUM SET, AND PRINT MEDIUM

This application is the U.S. National Phase under 35 U.S.C. § 371 of International Application PCT/JP2022/016357, filed Mar. 30, 2022, designating the U.S., and published in Japanese as WO 2022/224786 on Oct. 27, 2022, which claims priority to Japanese Patent Application No. 2021-070175, filed Apr. 19, 2021, the entire content of which are incorporated herein by reference.

TECHNICAL FIELD

The present invention relates to an inkjet ink, an inkjet recording method, an ink set, an ink and medium set, and a printed medium.

BACKGROUND ART

A recording method with an inkjet printer (inkjet recording method), which is one of representative methods among various color recording methods, involves generating small droplets of ink and adhering them to a printing medium such as paper to perform recording. In recent years, increasing demand for commercial and industrial applications has driven the demand for ink capable of printing on various printing media.

In commercial fields of catalogs, brochures, and the like, a printing medium having lower ink absorbency (hereinafter, also referred to as a "less ink-absorbent medium") than plain paper, such as coated paper and art paper, is often used. In industrial fields of outdoor signage, soft food packaging, and the like, a printing medium being non-absorbent of ink (hereinafter, also referred to as a "non-ink-absorbent medium"), such as a vinyl chloride film, a polyethylene terephthalate (PET) film, and a polyolefin film, is often used.

For the less ink-absorbent medium and non-ink-absorbent medium, a solvent ink using an organic solvent as the main solvent, a curable ink containing a polymerizable monomer, and the like have been developed. However, these inks have many safety issues for the natural environment and human body. Therefore, a growing trend in recent years has been for development of a water-based ink using water as the main solvent.

The water-based ink is generally less likely to wet and spread on the less ink-absorbent medium or non-ink-absorbent medium by its nature. In order to fix the water-based ink onto the printing medium, it is necessary to dry moisture or an organic solvent in the ink.

Patent Document 1 reports that an ink exhibiting good wettability to a non-ink-absorbent medium can be obtained by using three or more organic solvents with different water-octanol partition coefficients, even though water is used as the main solvent. However, the ink in Patent Document 1 has insufficient drying properties. Patent Document 2 reports that an ink composition in which the glass transition temperature, particle size, and solid content of a resin to be added are adjusted allows the ink to exhibit good drying properties even on a non-ink-absorbent medium. However, the ink in Patent Document 2 shows poor wettability on the non-ink-absorbent medium.

Although an organic solvent and a surfactant are generally used in a water-based ink to improve wettability, the more these materials are added, the better the wettability but the lower the drying properties. On the other hand, if the drying properties are excessively improved, drying starts immediately after droplets of the ink land on a printing medium. Since the ink is fixed thereon before sufficiently wetting and spreading, it may be difficult to get a high resolution of an image. As described above, wettability and drying properties have a trade-off relationship in the water-based ink, and an ink producing both of these effects has not yet proposed.

CITATION LIST

Patent Document

Patent Document 1: Japanese Unexamined Patent Application, Publication No. 2020-125382
Patent Document 2: Japanese Unexamined Patent Application, Publication No. 2020-55943

DISCLOSURE OF THE INVENTION

Problems to be Solved by the Invention

An object of the present invention is to provide: an inkjet ink exhibiting good wettability even on a non-ink-absorbent medium and excellent drying properties; an inkjet recording method using the inkjet ink; an ink set including the inkjet ink; an ink and medium set including the inkjet ink or the ink set and a printing medium; and a printed medium to which the inkjet ink or each inkjet ink included in the ink set has adhered.

Means for Solving the Problems

Specific means for achieving the above object includes embodiments described below.

1) An inkjet ink containing a coloring agent, an organic compound excluding the coloring agent, and water, in which the organic compound satisfies any one of conditions (A) to (C) below:

(A)
the organic compound contains:
a compound a: at least one compound selected from a compound represented by formula (1) below and a compound represented by formula (2) below;
a compound b: at least one compound selected from a compound represented by formula (3) below and a compound represented by formula (4) below; and
a compound c: at least one compound selected from the group consisting of C4-C5 alkanediol, a compound represented by formula (5) below, and a compound represented by formula (6) below,
in which relationships of (a)≤(c) and 0.1≤(c)/(b)≤50 are satisfied, when (a) represents, in parts by mass, the total contained amount of the compound a with respect to 100 parts by mass of the inkjet ink, (b) represents, in parts by mass, the total contained amount of the compound b with respect to 100 parts by mass of the inkjet ink, and (c) represents, in parts by mass, the total contained amount of the compound c with respect to 100 parts by mass of the inkjet ink;

(B)
the organic compound contains:
a compound a: at least one compound selected from a compound represented by formula (1) below and a compound represented by formula (2) below;
a compound b: at least one compound selected from a compound represented by formula (3) below and a compound represented by formula (4) below; and a compound c: at least one compound selected from the group consisting of C4-C5 alkanediol, a compound represented by formula (5) below, and a compound represented by formula (6) below, in which (a) is greater than 0.4, and a relationship of (a)>(c) is satisfied, when (a) represents, in parts by mass, the total contained amount of the compound a with respect to 100 parts by mass of the inkjet ink, and (c) represents, in parts by mass, the total contained amount of the compound c with respect to 100 parts by mass of the inkjet ink; and (C) the organic compound contains: 1,5-pentanediol and a compound d in which $R^1$ in formula (1) below is a C5-C6 hydrocarbon group, in which (d) is greater than 0.3, and a relationship of $1<(e)/(d)\leq 50$ is satisfied, when (e) represents, in parts by mass, the contained amount of 1,5-pentanediol with respect to 100 parts by mass of the inkjet ink, and (d) represents, in parts by mass, the total contained amount of the compound d with respect to 100 parts by mass of the inkjet ink:

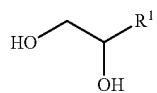
(1)

in formula (1), $R^1$ represents a linear or branched C5-C10 hydrocarbon group,

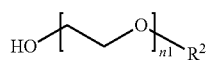
(2)

in formula (2), $R^2$ represents a linear or branched C6-C7 hydrocarbon group, and n1 represents 1 or 2,

HO—$R^3$—OH (3)

in formula (3), $R^3$ represents a linear or branched C7-C12 hydrocarbon group,

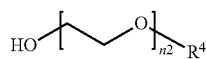
(4)

in formula (4), $R^4$ represents a phenyl group or a benzyl group, and n2 represents 1 or 2,

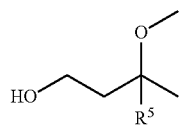
(5)

in formula (5), $R^5$ represents a hydrogen atom or a methyl group, and

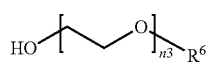
(6)

in formula (6), $R^6$ represents a linear or branched C1-C4 hydrocarbon group, and n3 represents 1 or 2.

2) The inkjet ink according to 1), in which the organic compound satisfies the condition (A) and a relationship of $1<(c)/(b)\leq 50$ is satisfied.

3) The inkjet ink according to 1) or 2), in which the coloring agent contains at least one selected from a pigment and a disperse dye.

4) An inkjet recording method, including discharging a droplet of the inkjet ink according to any one of 1) to 3) from an inkjet head to perform recording on a printing medium.

5) The inkjet recording method according to 4), in which the printing medium is less ink-absorbent or non-ink-absorbent printing medium.

6) The inkjet recording method according to 4) or 5), in which the inkjet head includes a circulation mechanism.

7) An ink set including: the inkjet ink according to any one of 1) to 3); and an additional inkjet ink different from the inkjet ink.

8) An ink and medium set including: the inkjet ink according to any one of 1) to 3) or the ink set according to 7); and a printing medium.

9) A printed medium to which the inkjet ink according to any one of 1) to 3) or each inkjet ink included in the ink set according to 7) has adhered.

Effects of the Invention

The present invention can provide: an inkjet ink exhibiting good wettability even on a non-ink-absorbent medium and excellent drying properties; an inkjet recording method using the inkjet ink; an ink set including the inkjet ink; an ink and medium set including the inkjet ink or the ink set and a printing medium; and a printed medium to which the inkjet ink or each inkjet ink included in the ink set has adhered.

PREFERRED MODE FOR CARRYING OUT THE INVENTION

Hereinafter, specific embodiments to which the present invention is applied will be described in detail. As used herein, "C.I." means a "color index". As used herein, the terms "alkylene", "propylene", and "alkyl" are used in a sense that encompasses both linear and branched structures, unless otherwise specified.

<Inkjet Ink>

The inkjet ink (hereinafter, also simply referred to as an "ink") according to the present embodiment contains a coloring agent, an organic compound excluding the coloring agent, and water. Hereinafter, components contained in the ink according to the present embodiment will be described in detail. Note that each of the components described below may be used alone or in combinations of two or more thereof.

[Coloring Agent]

The coloring agent available can be a known coloring agent such as a pigment, a disperse dye, and a solvent dye. Among them, the coloring agent preferably includes at least one selected from a pigment and a disperse dye, and more preferably includes a pigment.

Examples of the pigment include an inorganic pigment, an organic pigment, an extender pigment, and a hollow particle.

Examples of the inorganic pigment include carbon black, a metal oxide, a metal hydroxide, a metal sulfide, a metal ferrocyanide, and a metal chloride.

When the ink according to the present embodiment is a black ink and the coloring agent is an inorganic pigment, the inorganic pigment contained in the black ink is preferably carbon black such as thermal black, acetylene black, oil furnace black, gas furnace black, lamp black, gas black, and channel black. Specific examples of the carbon black include the Raven series manufactured by Columbia Carbon; the Monarch series, Regal series, and Mogul series manufactured by Cabot Corporation; the HiBlack series, Color Black series, Printex series, Special Black series, and Nerox series manufactured by Orion Engineered Carbons; and the MA series, MCF series, No. 25, No. 33, No. 40, No. 47, No. 52, No. 900, and No. 2300 manufactured by Mitsubishi Chemical Corporation.

When the ink according to the present embodiment is a white ink and the coloring agent is an inorganic pigment, examples of the inorganic pigment contained in the white ink include an oxide, nitride, or oxynitride of a metal such as zinc, silicon, aluminum, titanium, strontium, and zirconium; and an inorganic compound such as glass and silica. Among them, titanium dioxide and zinc oxide are preferred.

Examples of the organic pigment include various pigments such as azo, disazo, phthalocyanine, quinacridone, isoindolinone, dioxazine, perylene, perinone, thioindigo, anthraquinone, and quinophthalone.

Specific examples of the organic pigment include yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199, 202, and 213; red pigments such as C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264, 269, and 272; blue pigments such as C.I. Pigment Blue 1, 2, 3, 15, 15:1, 15:2, 15:3, 15:4, 15:6, 16, 22, 25, 60, 66, and 80; violet pigments such as C.I. Pigment Violet 19, 23, 29, 37, 38, and 50; orange pigments such as C.I. Pigment Orange 13, 16, 43, 68, 69, 71, and 73; green pigments such as C.I. Pigment Green 7, 36, and 54; and black pigments such as C.I. Pigment Black 1. Among them, C.I. Pigment Blue 15:4 is preferred.

Examples of the extender pigment include silica, calcium carbonate, talc, clay, barium sulfate, and white carbon. The extender pigment is often used in combination with other coloring agents.

The hollow particle available can be a known hollow particle described in, for example, U.S. Pat. No. 4880465, Japanese Patent No. 3562754, Japanese Patent No. 6026234, Japanese Patent No. 5459460, Japanese Unexamined Patent Application, Publication No. 2003-268694, and Japanese Patent No. 4902216, and in particular, is preferably used as a white pigment.

The disperse dye is preferably, for example, a dye selected from C.I. Disperse. Specific examples thereof include yellow dyes such as C.I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; red dyes such as C.I. Disperse Red 60, 73, 88, 91, 92, 111, 127, 131, 143, 145, 146, 152, 153, 154, 167, 179, 191, 192, 206, 221, 258, and 283; orange dyes such as C.I. Disperse Orange 9, 25, 29, 30, 31, 32, 37, 38, 42, 44, 45, 53, 54, 55, 56, 61, 71, 73, 76, 80, 96, and 97; violet dyes such as C.I. Disperse Violet 25, 27, 28, 54, 57, 60, 73, 77, 79, and 79:1; and blue dyes such as C.I. Disperse Blue 27, 56, 60, 79:1, 87, 143, 165, 165:1, 165:2, 181, 185, 197, 202, 225, 257, 266, 267, 281, 341, 353, 354, 358, 364, 365, and 368.

The solvent dye is preferably, for example, a dye selected from C.I. Solvent.

The average particle size of the coloring agent is preferably 30 to 300 nm, and more preferably 50 to 250 nm. The average particle size as used herein refers to an average particle size of particles as measured using laser light scattering.

The content of the coloring agent is preferably 1% to 30% by mass, more preferably 1% to 10% by mass, and even more preferably 2% to 8% by mass with respect to the total mass of the ink according to the present embodiment.

[Organic Compound]

The organic compound satisfies any one of conditions (A) to (C) below:

(A)
the organic compound contains:
a compound a: at least one compound selected from a compound represented by formula (1) below and a compound represented by formula (2) below;
a compound b: at least one compound selected from a compound represented by formula (3) below and a compound represented by formula (4) below; and
a compound c: at least one compound selected from the group consisting of C4-C5 alkanediol, a compound represented by formula (5) below, and a compound represented by formula (6) below,
in which relationships of (a)≤(c) and 0.1≤(c)/(b)≤50 are satisfied, when (a) represents, in parts by mass, the total contained amount of the compound a with respect to 100 parts by mass of the ink according to the present embodiment, (b) represents, in parts by mass, the total contained amount of the compound b with respect to 100 parts by mass of the ink according to the present embodiment, and (c) represents, in parts by mass, the total contained amount of the compound c with respect to 100 parts by mass of the ink according to the present embodiment;

(B)
the organic compound contains:
a compound a: at least one compound selected from a compound represented by formula (1) below and a compound represented by formula (2) below;
a compound b: at least one compound selected from a compound represented by formula (3) below and a compound represented by formula (4) below; and
a compound c: at least one compound selected from the group consisting of C4-C5 alkanediol, a compound represented by formula (5) below, and a compound represented by formula (6) below,
in which (a) is greater than 0.4, and a relationship of (a)>(c) is satisfied, when (a) represents, in parts by mass, the total contained amount of the compound a with respect to 100 parts by mass of the ink according to the present embodiment, and (c) represents, in parts by mass, the total contained amount of the compound c with respect to 100 parts by mass of the ink according to the present embodiment; and (C)
the organic compound contains: 1,5-pentanediol and a compound d in which $R^1$ in formula (1) below is a C5-C6 hydrocarbon group, in which (d) is greater than 0.3, and a relationship of 1<(e)/(d)≤50 is satisfied, when (e) represents, in parts by mass, the contained amount of 1,5-pentanediol with respect to 100 parts by mass of the ink according to the present embodiment, and (d) represents, in parts by mass, the total contained amount of the compound d with respect to 100 parts by mass of the ink according to the present embodiment.

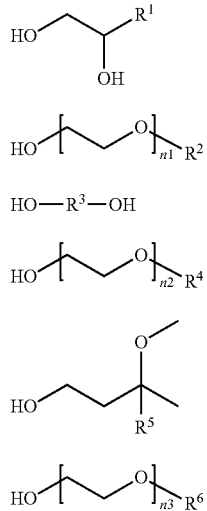

In formula (1), R$^1$ represents a linear or branched C5-C10 hydrocarbon group. Examples of the C5-C10 hydrocarbon group include a n-pentyl group, an isopentyl group, a neopentyl group, a sec-pentyl group, a tert-pentyl group, a 2-methylbutyl group, a 1-ethylpropyl group, a 1,2-dimethylpropyl group, a n-hexyl group, an isohexyl group, a neohexyl group, a sec-hexyl group, a tert-hexyl group, a 2-methylpentyl group, a 3-methylpentyl group, a 2,2-dimethylbutyl group, a 2-ethylbutyl group, a n-heptyl group, an isoheptyl group, a sec-heptyl group, a tert-heptyl group, a n-octyl group, an isooctyl group, a n-nonyl group, an isononyl group, a sec-nonyl group, and a n-decyl group. R$^1$ is preferably a linear or branched C5-C7 hydrocarbon group.

In formula (2), R$^2$ represents a linear or branched C6-C7 hydrocarbon group. Examples of the C6-C7 hydrocarbon group include a n-hexyl group, an isohexyl group, a neohexyl group, a sec-hexyl group, a tert-hexyl group, a 2-methylpentyl group, a 3-methylpentyl group, a 2,2-dimethylbutyl group, a 2-ethylbutyl group, a n-heptyl group, an isoheptyl group, a sec-heptyl group, and a tert-heptyl group. R$^2$ is preferably a linear or branched C6 hydrocarbon group. In formula (2), n1 represents 1 or 2, preferably 2.

In formula (3), R$^3$ represents a linear or branched C7-C12 hydrocarbon group. Examples of the C7-C12 hydrocarbon group include a n-heptylene group, a 1-methyl hexylene group, a 2-methylhexylene group, a 3-methylhexylene group, a 1,5-dimethylpentylene group, a 2,4-dimethylpentylene group, a n-octylene group, a 1-methylheptylene group, a 2-methylheptylene group, a 3-methylheptylene group, a 4-methylheptylene group, a 1,6-dimethylhexylene group, a 2,5-dimethylhexylene group, a 2-ethylpentylene group, a 2-ethyl-1-propylpropylene group, a n-nonylene group, a 1-methyloctylene group, a 2-methyloctylene group, a 3-methyloctylene group, a 4-methyloctylene group, a 1,7-dimethylheptylene group, a 2,6-dimethylheptylene group, a 3,5-dimethylheptylene group, a 2-butyl-2-ethylpropylene group, a n-decylene group, a n-undecylene group, and a n-dodecylene group. R$^3$ is preferably a linear or branched C7-C9 hydrocarbon group.

In formula (4), R$^4$ represents a phenyl group or a benzyl group, preferably a phenyl group. In formula (4), n2 represents 1 or 2, preferably 2.

In formula (5), R$^5$ represents a hydrogen atom or a methyl group, preferably a hydrogen atom.

In formula (6), R$^3$ represents a linear or branched C1-C4 hydrocarbon group. Examples of the C1-C4 hydrocarbon group include a methyl group, an ethyl group, a n-propyl group, an isopropyl group, a n-butyl group, an isobutyl group, a sec-butyl group, and a tert-butyl group. R$^6$ is preferably a linear or branched C3-C4 hydrocarbon group. In formula (6), n3 represents 1 or 2, preferably 2.

Examples of the compound a include 1,2-heptanediol, 1,2-octanediol, 1,2-nonanediol, 1,2-decanediol, 1,2-undecanediol, 1,2-dodecanediol, diethylene glycol monohexyl ether, diethylene glycol monoheptyl ether, ethylene glycol monohexyl ether, and ethylene glycol monoheptyl ether, and 1,2-nonanediol, diethylene glycol monohexyl ether, and ethylene glycol monohexyl ether are preferred. The compound a is highly hydrophobic and has a property of being easily oriented to the ink surface after the ink lands on the printing medium. It is considered that this property lowers the surface tension of the ink and promotes the wetting and spreading of the ink on the printing medium, resulting in excellent wettability.

Examples of the compound b include 1,7-heptanediol, 1,8-octanediol, 2-ethyl-1,3-hexanediol, 1,9-nonanediol, 2-butyl-2-ethyl-1,3-propanediol, 1,10-decanediol, 1,11-undecanediol, 1,12-dodecanediol, ethylene glycol monophenyl ether, ethylene glycol monobenzyl ether, diethylene glycol monophenyl ether, and diethylene glycol monobenzyl ether, and 1,7-heptanediol, 1,8-octanediol, 1,9-nonanediol, 2-butyl-2-ethyl-1,3-propanediol, ethylene glycol monophenyl ether, ethylene glycol monobenzyl ether, diethylene glycol monophenyl ether, and diethylene glycol monobenzyl ether are preferred. The compound b has a property of being easily oriented to the interface between the ink and the printing medium after the ink lands on the printing medium. It is considered that this property lowers the interfacial tension generated at the interface between the ink and the printing medium and promotes the wetting and spreading of the ink on the printing medium, resulting in excellent wettability.

Examples of the compound c include 1,2-butanediol, 1,3-butanediol, 1,4-butanediol, 1,2-pentanediol, 1,3-pentanediol, 1,4-pentanediol, 1,5-pentanediol, 3-methoxy-3-methyl-1-butanol, 3-methoxy-1-butanol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, and diethylene glycol monobutyl ether, and 1,4-butanediol, 1,5-pentanediol, 3-methoxy-3-methyl-1-butanol, 3-methoxy-1-butanol, ethylene glycol monobutyl ether, and diethylene glycol monobutyl ether are preferred. The compound c has a good balance between hydrophilic and hydrophobic properties, and a property of being soluble in any of water and the compounds a, b, and d contained in the ink. It is considered that this property makes it possible to stably dissolve the compounds a, b, and d even in a water-based ink, where water accounts for the majority of the total mass of the ink, thus preventing phase separation of the ink.

Examples of the compound d include 1,2-heptanediol and 1,2-octanediol. The compound d is highly hydrophobic and has a property of being easily oriented to both the ink surface and the interface between the ink and the printing medium after the ink lands on the printing medium. It is considered that this property lowers not only the surface tension of the ink but also the interfacial tension generated at the interface between the ink and the printing medium and promotes the wetting and spreading of the ink on the printing medium, resulting in excellent wettability.

The condition (A) is that the organic compound contains the compounds a to c, in which the relationships of (a)≤(c) and 0.1≤(c)/(b)≤50 are satisfied, when (a) represents, in parts by mass, the total contained amount of the compound a with respect to 100 parts by mass of the ink according to the present embodiment, (b) represents, in parts by mass, the total contained amount of the compound b with respect to 100 parts by mass of the ink according to the present embodiment, and (c) represents, in parts by mass, the total contained amount of the compound c with respect to 100 parts by mass of the ink according to the present embodiment. When the organic compound satisfies the condition (A), the value of (c)/(b) above is preferably greater than 1 and 50 or less, more preferably greater than 1 and less than 50, even more preferably 5 to 30, particularly preferably 6 to 20, and extremely preferably 7 to 19. When the organic compound satisfies the condition (A), the total contained amount of the compound a with respect to 100 parts by mass of the ink according to the present embodiment is preferably 0.1 to 10 parts by mass, more preferably 0.1 to 7 parts by mass, even more preferably 0.1 to 5 parts by mass, and particularly preferably 0.2 to 1.0 parts by mass. The total contained amount of the compound b with respect to 100 parts by mass of the ink according to the present embodiment is preferably 0.05 to 10 parts by mass, more preferably 0.05 to 8 parts by mass, and even more preferably 0.05 to 6 parts by mass. The total contained amount of the compound c with respect to 100 parts by mass of the ink according to the present embodiment is preferably 1 to 20 parts by mass, more preferably 1 to 15 parts by mass, and even more preferably 1 to 10 parts by mass.

When the organic compound satisfies the condition (A), the ink may have both drying properties and wettability to a less ink-absorbent medium and a non-ink-absorbent medium while ensuring compatibility of the ink. In particular, when the value of (c)/(b) above is adjusted to 0.1 to 50, the compound b is stably dissolved in the ink without phase separation, and the ink tends to exhibit sufficient wettability.

The condition (B) is that the organic compound contains the compounds a to c, in which (a) is greater than 0.4, and the relationship of (a)>(c) is satisfied, when (a) represents, in parts by mass, the total contained amount of the compound a with respect to 100 parts by mass of the ink according to the present embodiment, and (c) represents, in parts by mass, the total contained amount of the compound c with respect to 100 parts by mass of the ink according to the present embodiment. When the organic compound satisfies the condition (B), the total contained amount of the compound a with respect to 100 parts by mass of the ink according to the present embodiment is preferably greater than 0.4 parts by mass and 4 parts by mass or less, more preferably 0.5 to 4 parts by mass, and even more preferably 0.5 to 2 parts by mass. The total contained amount of the compound b with respect to 100 parts by mass of the ink according to the present embodiment is preferably 0.05 to 5 parts by mass, more preferably 0.05 to 3 parts by mass, and even more preferably 0.05 to 2 parts by mass. In addition, the total contained amount of the compound c with respect to 100 parts by mass of the ink according to the present embodiment is preferably 0.1 to 3.5 parts by mass, more preferably 0.1 to 3 parts by mass, and even more preferably 0.1 to 2 parts by mass.

When the organic compound satisfies the condition (B), the ink may have both drying properties and wettability to a less ink-absorbent medium and a non-ink-absorbent medium while ensuring compatibility of the ink. In particular, when (a) is 0.4 or less, the compound a is stably dissolved in the ink without phase separation, and the ink tends to exhibit sufficient drying properties.

The condition (C) is that the organic compound contains 1,5-pentanediol and the compound d, in which (d) is greater than 0.3, and the relationship of 1<(e)/(d)≤50 is satisfied, when (e) represents, in parts by mass, the contained amount of 1,5-pentanediol with respect to 100 parts by mass of the ink according to the present embodiment, and (d) represents the total contained amount of the compound d with respect to 100 parts by mass of the ink according to the present embodiment. When the organic compound satisfies the condition (C), the value of (e)/(d) above is preferably 2 to 30, and more preferably 5 to 20. When the organic compound satisfies the condition (C), the contained amount of 1,5-pentanediol with respect to 100 parts by mass of the ink according to the present embodiment is preferably greater than 0.3 parts by mass and 20 parts by mass or less, more preferably 0.5 to 10 parts by mass, and even more preferably 1 to 7 parts by mass. The total contained amount of the compound d with respect to 100 parts by mass of the ink according to the present embodiment is preferably 0.3 to 5 parts by mass, more preferably 0.3 to 3 parts by mass, and even more preferably 0.4 to 2 parts by mass.

When the organic compound satisfies the condition (C), the ink may have both drying properties and wettability to a less ink-absorbent medium and a non-ink-absorbent medium while ensuring the compatibility of the ink. In particular, when the value of (e)/(d) above is adjusted to greater than 1, the compound d tends to stably dissolve in the ink without phase separation, and when the value of (e)/(d) above is adjusted to 50 or less, the ink tends to exhibit sufficient wettability. In addition, when (d) above is adjusted to greater than 0.3, the ink tends to exhibit sufficient wettability, and when (d) above is adjusted to 4 or less, the compound d is stably dissolved in the ink without phase separation, and the ink tends to exhibit sufficient drying properties.

[Water]

The water is preferably water with a small contained amount of impurities such as metal ions, i.e., ion-exchanged water, distilled water, or the like.

The water content with respect to the total mass of the ink according to the present embodiment is preferably 50 to 90% by mass, more preferably 60 to 90% by mass, and even more preferably 70 to 90% by mass.

[Other Components]

The ink according to the present embodiment may contain an ink preparation agent such as a dispersant, an organic solvent, a surfactant, a fungicide, a preservative, a pH adjuster, a chelating reagent, a rust inhibitor, a defoamer, a water-soluble ultraviolet absorber, an antioxidant, and a resin emulsion, if necessary. The contained amount of each ink preparation agent can be arbitrarily set according to the application of the ink and the like.

(Dispersant)

Examples of the dispersant include a copolymer composed of at least two monomers (preferably at least one of which is a hydrophilic monomer) selected from monomers such as styrene and a derivative thereof; vinylnaphthalene and a derivative thereof; an aliphatic alcohol ester of a, B-ethylene unsaturated carboxylic acids; (meth)acrylic acid and a derivative thereof; maleic acid and a derivative thereof; itaconic acid and a derivative thereof; fumaric acid and a derivative thereof; and vinyl acetate, vinyl alcohol, vinyl pyrrolidone, or acrylamide and a derivative thereof.

The hydrophilic monomer includes a monomer in which a carboxyl group remains after polymerization, such as acrylic acid and methacrylic acid.

Examples of the copolymer include a styrene-(meth) acrylic acid copolymer, a styrene-(meth)acrylic acid-(meth) acrylic acid ester copolymer, a (meth)acrylic acid ester-(meth)acrylic acid copolymer, a polyethylene glycol (meth) acrylate-(meth) acrylic acid copolymer, and a styrene-maleic acid copolymer. Among them, a styrene-(meth) acrylic acid copolymer, a styrene-(meth)acrylic acid-(meth) acrylic acid ester copolymer, a (meth)acrylic acid ester-(meth)acrylic acid copolymer, and a polyethylene glycol (meth)acrylate-(meth) acrylic acid copolymer are preferred; a styrene-(meth) acrylic acid copolymer, a styrene-(meth) acrylic acid-(meth) acrylic acid ester copolymer, and a (meth)acrylic acid ester-(meth)acrylic acid copolymer are more preferred; a (meth)acrylic acid ester-(meth)acrylic acid copolymer are even more preferred; and a methacrylic acid ester-methacrylic acid copolymer is particularly preferred. Examples of the copolymer include a block copolymer, a random copolymer, and a graft copolymer. The copolymer may be in the form of a salt.

As used herein, the term "(meth)acrylic" is used in a sense that includes both "acrylic" and "methacrylic". The same applies to "(meth)acrylate" and the like.

The dispersant can be synthesized or obtained as a commercially available product.

Examples of the dispersant obtained by synthesis include an A-B block polymer disclosed in International Publication No. WO 2013/115071. The monomer constituting an A block of the A-B block polymer disclosed in International Publication No. WO 2013/115071 is at least one monomer selected from (meth)acrylic acid and linear or branched C4 alkyl (meth)acrylate, preferably at least one monomer selected from methacrylic acid and n-butyl methacrylate, and more preferably a combination of these two monomers. In addition, the monomer constituting a B block of the A-B block polymer disclosed in International Publication No. WO 2013/115071 is at least one monomer selected from benzyl methacrylate and benzyl acrylate, preferably benzyl methacrylate. Specific examples of the A-B block polymer include block copolymers disclosed in Synthesis Examples 3 to 8 of International Publication No. WO 2013/115071.

Examples of the commercially available dispersant include Joncryl 62, 67, 68, 678, or 687 (styrene-acrylic copolymer manufactured by BASF SE); ARON AC-10SL (polyacrylic acid manufactured by Toagosei Co., Ltd.); and BYKJET 9151, 9152, 9170, or 9171 (wet dispersant manufactured by BYK).

The mass average molecular weight (MW) of the dispersant is preferably 3000 to 50000, and more preferably 7000 to 25000. The mass average molecular weight of the dispersant can be measured by gel permeation chromatography (GPC). Specifically, the measurement can be performed by using HLC-8320 GPC (manufactured by Tosoh Corporation) as a GPC device, two TSK gel Super MultIpore HZ-H (manufactured by Tosoh Corporation, inner diameter of 4.6 mm×15 cm) as columns, tetrahydrofuran as an eluent, and TSK Standard (manufactured by Tosoh Corporation) as a standard sample.

The acid value of the dispersant is preferably 50 to 300 mg KOH/g, more preferably 80 to 275 mg KOH/g, and even more preferably 80 to 250 mg KOH/g.

The dispersant can be used in a state of mixture with a coloring agent. In addition, the coloring agent may be used in a state where part or all of the surface thereof is covered with the dispersant. Alternatively, both of these states may be used together.

When the ink according to the present embodiment contains the dispersant, a ratio of the total mass of the dispersant to the total mass of the coloring agent is preferably 0.01 to 1.0, more preferably 0.05 to 0.6, and even more preferably 0.1 to 0.5.

(Organic Solvent)

Examples of the organic solvent include C1-C6 alkanol such as methanol, ethanol, propanol, isopropanol, butanol, isobutanol, secondary butanol, and tertiary butanol; carboxylic acid amide such as N, N-dimethylformamide and N, N-dimethylacetamide; lactam such as 2-pyrrolidone, N-methyl-2-pyrrolidone, and N-methylpyrrolidin-2-one; cyclic urea such as 1,3-dimethylimidazolidin-2-one and 1,3-dimethyl hexahydropyrimid-2-one; ketone, keto-alcohol, or carbonate such as acetone, 2-methyl-2-hydroxypentan-4-one, and ethylene carbonate; cyclic ether such as tetrahydrofuran and dioxane; mono-, oligo-, or polyalkylene glycol or thioglycol having a C2-C6 alkylene unit such as ethylene glycol, diethylene glycol, 1,2-propylene glycol, 1,3-propylene glycol, triethylene glycol, tetraethylene glycol, dipropylene glycol, polyethylene glycol (preferably with a molecular weight of 400, 800, 1540, or more), polypropylene glycol, thiodiglycol, and dithiodiglycol; C3-C9 polyol (triol) such as glycerol, diglycerol, hexane-1, 2,6-triol, and trimethylolpropane; glycol ether (preferably C7-C10 triethylene glycol ether or C4-C13 mono-, di-, or tripropylene glycol ether) such as ethylene glycol monoallyl ether, triethylene glycol monomethyl ether, triethylene glycol monoethyl ether, triethylene glycol monobutyl ether, propylene glycol monopropyl ether, propylene glycol monobutyl ether, dipropylene glycol monopropyl ether, and dipropylene glycol monomethyl ether; C6-C9 alkanediol (but excluding those included in formulae (1) and (3)) such as 1,2-hexanediol, 1,6-hexanediol, and 2-methyl-2,4-pentanediol; Y-butyrolactone; and dimethyl sulfoxide.

(Surfactant)

Examples of the surfactant include an anionic surfactant, a nonionic surfactant, a silicone surfactant, and a fluorinated surfactant. Among them, a surfactant selected from a silicone surfactant and a fluorinated surfactant is preferred, and a silicone surfactant is more preferred from the viewpoint of safety to living organisms and the environment.

Examples of the anionic surfactant include an alkyl sulfocarboxylate, an α-olefin sulfonate, a polyoxyethylene alkyl ether acetate, a polyoxyethylene alkyl ether sulfate, an N-acyl amino acid or a salt thereof, an N-acyl methyl taurine salt, an alkyl sulfate polyoxyalkyl ether sulfate, an alkyl sulfate polyoxyethylene alkyl ether phosphate, a rosin acid soap, a castor oil sulfate ester salt, a lauryl alcohol sulfate ester salt, an alkylphenol-type phosphate ester, an alkyl-type phosphate ester, an alkylaryl sulfonate, a diethyl sulfosuccinate, diethyl hexylsulfosuccinate, and a dioctyl sulfosuccinate.

Examples of the nonionic surfactant include an ether surfactant such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, and polyoxyethylene distyrenated phenyl ether (e.g., Emulgen A-60, A-90, and A-500, manufactured by Kao Corporation); an ester surfactant such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; an acetylene glycol (or acetylenic alcohol) surfactant (e.g., Surfynol 104, 104PG50, 82, 420, 440, 465, and 485; and Olfine STG, manufactured by Evonik Japan Co., Ltd.) such as 2,4,7,9-tetramethyl-5-decyne-4,7-diol, 3,6-dimethyl-4-octyne-3,6-diol, and 3,5-dimethyl-1-hexyn-3-ol; and a polyglycol ether surfactant.

Examples of the silicone surfactant include polyether-modified siloxane and polyether-modified polydimethylsiloxane. Examples thereof include Dynol 960 and 980, manufactured by Air Products and Chemicals, Inc.; Silface SAG001, SAG002, SAG003, SAG005, SAG503A, SAG008, SAG009, and SAG010, manufactured by Nissin Chemical Industry Co., Ltd.; BYK-345, 347, 348, 349, 3450 (aka BYKLPX 23289), 3451 (aka BYKLPX 23347), 3455, LP-X23288, and LP G20726, manufactured by BYK; and TEGO Twin 4000 and TEGO Wet KL 245, 250, 260, 265, 270, and 280, manufactured by Evonic Tego Chemie GmbH.

Examples of the fluorinated surfactant include a perfluoroalkyl sulfonic acid compound, a perfluoroalkyl carboxylic acid compound, a perfluoroalkyl phosphate ester compound, a perfluoroalkyl ethylene oxide adduct, and a polyoxyalkylene ether polymer compound having a perfluoroalkyl ether group in a side chain thereof. Examples of the commercially available product include Capstone FS-30 and FS-31 manufactured by The Chemours Company.

(Fungicide)

Examples of the fungicide include sodium dehydroacetate, sodium benzoate, sodium pyridinethion-1-oxide, p-hydroxybenzoic acid ethyl ester, and 1,2-benzisothiazolin-3-one and a salt thereof.

(Preservative)

Examples of the preservative include an organic sulfur compound, an organic nitrogen sulfur compound, an organic halogen compound, a haloarylsulfone compound, an iodopropargyl compound, a haloalkylthio compound, a nitrile compound, a pyridine compound, an 8-oxyquinoline compound, a benzothiazole compound, an isothiazoline compound, a dithiol compound, a pyridine oxide compound, a nitropropane compound, an organotin compound, a phenol compound, a quaternary ammonium salt compound, a triazine compound, a thiazine compound, an anilide compound, an adamantane compound, a dithiocarbamate compound, a brominated indanone compound, a benzyl bromoacetate compound, and an inorganic salt compound. Specific examples of the organic halogen compound include sodium pentachlorophenol. Specific examples of the pyridine oxide compound include sodium 2-pyridinethiol-1-oxide. Specific examples of the isothiazoline compound include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Specific examples of the other preservative and fungicide include anhydrous sodium acetate, sodium sorbate, sodium benzoate, and trade names Proxel GXL (S), Proxel LV, and Proxel XL-2 (S), manufactured by Arch Chemicals Inc.

(pH Adjuster)

Examples of the pH adjuster include alkanolamine such as diethanolamine, triethanolamine, and N-methyldiethanolamine; a hydroxide of an alkali metal such as lithium hydroxide, sodium hydroxide, and potassium hydroxide; ammonium hydroxide (aqueous ammonia); a carbonate of an alkali metal such as lithium carbonate, sodium carbonate, sodium bicarbonate, and potassium carbonate; an alkali metal salt of an organic acid such as sodium silicate and potassium acetate; and an inorganic base such as disodium phosphate.

(Chelating Reagent)

Examples of the chelating reagent include disodium ethylenediaminetetraacetate, sodium nitrilotriacetate, sodium hydroxyethylethylenediaminetriacetate, sodium diethylenetriaminepentaacetate, and sodium uracil diacetate.

(Rust Inhibitor)

Examples of the rust inhibitor include acid sulfite, sodium thiosulfate, ammonium thioglycolate, diisopropylammonium nitrite, pentaerythritol tetranitrate, and dicyclohexylammonium nitrite.

(Defoamer)

Examples of the defoamer include a silicone compound, a silica mineral oil compound, an olefin compound, and an acetylene compound. Examples of the commercially available defoamer include Surfynol DF37, DF58, DF110D, DF220, and MD-20, and Olfine SK-14, manufactured by Shin-Etsu Chemical Co., Ltd.

(Water-soluble Ultraviolet Absorber)

Examples of the water-soluble ultraviolet absorber include a sulfonated benzophenone compound, a benzotriazol compound, a salicylic acid compound, a cinnamic acid compound, and a triazine compound.

(Antioxidant)

The antioxidant available can be various organic and metal complex antifading agents. Examples of the organic antifading agents include hydroquinones, alkoxyphenols, dialkoxyphenols, phenols, anilines, amines, indanes, chromanes, alkoxyanilines, and heterocycles.

(Resin Emulsion)

The ink according to the present embodiment may contain a resin emulsion for the purpose of improving fixing properties of the ink to a printing medium. When the ink according to the present embodiment contains the resin emulsion, an image printed on a printing medium tends to have improved fastness, such as water resistance, abrasion resistance, and alcohol resistance. The resin emulsion is preferably at least one selected from a polymer emulsion and a wax emulsion.

Examples of the polymer emulsion include an emulsion containing a urethane polymer, a polyester polymer, an acrylic polymer, a vinyl acetate polymer, a vinyl chloride polymer, a styrene-acrylic polymer, an acryl-silicone polymer, and a styrene-butadiene polymer. Among these, emulsions of polymers selected from urethane, acrylic, and styrene-butadiene polymers are preferred.

Examples of the commercially available polymer emulsion include Superflex 420, 470, and 890 (urethane resin emulsions, all manufactured by DKS Co. Ltd.); Hydran HW-350, HW-178, HW-163, HW-171, AP-20, AP-30, WLS-201, and WLS-210 (urethane resin emulsions, all manufactured by DIC Corporation); 0569, 0850Z, and 2108 (styrene-butadiene resin emulsions, all manufactured by JSR Corporation); AE980, AE981A, AE982, AE986B, and AE104 (acrylic resin emulsions, all manufactured by Emulsion Technology Co., Ltd.); NeoCryl A-1105, A-1125, and A-1127 (acrylic resin emulsions, all manufactured by DSM Coating Resins Ltd.); and NeoCryl A-655 (styrene-acrylic resin emulsion, manufactured by DSM Coating Resins Ltd.).

The wax emulsion available can be an emulsion in which a natural wax or a synthetic wax is dispersed in an aqueous medium.

Examples of the natural wax emulsion include an emulsion of a wax such as petroleum waxes such as paraffin waxes and microcrystalline waxes; lignite waxes such as montane waxes; vegetable waxes such as carnauba waxes and candelilla waxes; and animal and plant waxes such as beeswax and lanolin.

Examples of the synthetic wax emulsion include an emulsion of a polyalkylene wax (preferably, a poly-C2-C4 alkylene wax), an oxidized polyalkylene wax (preferably, an oxidized poly-C2-C4 alkylene wax), and a paraffin wax. Among them, emulsions of waxes selected from a polyethylene wax, a polypropylene wax, an oxidized polyethylene wax, an oxidized polypropylene wax, and a paraffin wax are preferred.

The average particle size of the wax is preferably 50 nm to 5 μm, and more preferably 100 nm to 1 μm in order to prevent clogging of an inkjet head.

Examples of the commercially available wax emulsion include CERAFLOUR 925, 929, 950, and 991, AQUACER 498, 515, 526, 531, 537, 539, 552, and 1547, and AQUAMAT 208, 263, and 272; MINERPOL 221 (all manufactured by BYK); Mitsui Hi-WAX NL100, NL200, NL500, 4202E, 1105A, 2203A, NP550, NP055, and NP505 (all manufactured by Mitsui Chemicals, Inc.); KUE-100 and 11 (all manufactured by Sanyo Chemical Industrial, Co., Ltd.); and HYTEC P-5300, E-6500, 9015, and 6400 (all manufactured by Toho Chemical Industry, Co., Ltd.).

When the ink according to the present embodiment contains a resin emulsion, the content as solid content thereof is preferably 1 to 20% by mass, and more preferably 3 to 15% by mass. When the content as solid content of the resin emulsion is 1% by mass or more, the ink tends to exhibit good fixing properties to a printing medium. In addition, when the content as solid content of the resin emulsion is 20% by mass or less, the discharge properties and storage stability of the ink tend to be good.

[Ink Preparation Method and Other Features]

The method of preparing the ink according to the present embodiment is not particularly limited, and any known preparation method can be employed. Examples thereof include a method of preparing a dispersion liquid containing a coloring agent and a dispersant, adding water, organic compounds such as the compounds a to c, and if necessary, an ink preparation agent, to this dispersion liquid, and mixing it.

Examples of the method of preparing the dispersion liquid include a phase inversion emulsification method, an acid precipitation method, an interfacial polymerization method, an in-situ polymerization method, a submerged curing coating method, a coacervation (phase separation) method, a submerged drying method, a melt-dispersion cooling method, an in-air suspension coating method, and a spray drying method. Among them, the phase inversion emulsification method, the acid precipitation method, and the interfacial polymerization method are preferred, and the phase inversion emulsification method is more preferred.

When the dispersion liquid is prepared by the phase inversion emulsification method, for example, the dispersant is dissolved in an organic solvent such as 2-butanone, and an aqueous solution of a neutralizer is added to prepare an emulsified liquid. A coloring agent is added to the resulting emulsified liquid for dispersion treatment. From the liquid thus obtained, the organic solvent and part of the water can be distilled under reduced pressure, thereby obtaining the desired dispersion liquid.

The dispersion treatment can be carried out using a sand mill (bead mill), a roll mill, a ball mill, a paint shaker, an ultrasonic disperser, a microfluidizer, or the like. For example, when the sand mill is used, the dispersion treatment can be performed by using beads with a particle size of about 0.01 to 1 mm and by appropriately setting the packing ratio of the beads. By performing operations such as filtration and centrifugation on the dispersion liquid obtained as described above, the particle sizes of the particles contained in the dispersion liquid can be made uniform. When foaming occurs during the preparation of the dispersion liquid, a known silicone or acetylene glycol defoamer can be added in an extremely small amount.

The ink according to the present embodiment preferably has a low content of inorganic impurities such as chloride of metal cations (e.g., sodium chloride) and metal sulfate (e.g., sodium sulfate). Such inorganic impurities are often present in a commercially available coloring agent. The standard content of inorganic impurities is approximately 1% by mass or less with respect to the total mass of the coloring agent, and the lower limit is below the detection limit of the analyzer, i.e., 0% by mass is ideal. Examples of the method of obtaining a coloring agent with few inorganic impurities include a method using a reverse osmosis membrane; a method of suspending and stirring a solid coloring agent in a mixed solvent of C1-C4 alcohol such as methanol and water and separating the colored body through filtration, followed by drying; and a method of exchanging and adsorbing inorganic impurities with an ion exchange resin.

The ink according to the present embodiment is preferably microfiltered in advance. A membrane filter, glass filter paper, or the like can be used for microfiltration. The pore size of the filter or the like when performing microfiltration is usually 0.5 to 20 μm, preferably 0.5 to 10 μm.

The ink according to the present embodiment is also excellent in storage stability, redispersibility, color development, and chroma. The printed image recorded using the ink according to the present embodiment is also excellent in various fastness such as light resistance, heat resistance, and oxidation gas resistance (e.g., ozone gas resistance). In addition, the ink according to the present embodiment has little coating unevenness during image formation and is also excellent in image formability.

<Ink Set and Ink and Medium Set>

The ink set according to the present embodiment includes the above-described ink according to the present embodiment and an additional ink different from the ink. The additional ink is not particularly limited as long as it has a configuration different from that of the ink according to the present embodiment but preferably has a hue different from that of the ink according to the present embodiment.

In addition, the ink and medium set according to the present embodiment includes the above-described ink or ink set according to the present embodiment and a printing medium.

The printing medium is not particularly limited but preferably a less ink-absorbent or non-ink-absorbent printing medium, and more preferably a non-ink-absorbent printing medium. Examples of the less ink-absorbent printing medium include plain paper without an ink-receiving layer, a medium used in rotogravure or offset printing, art paper, coated paper, matte paper, and cast paper. Further, examples of the non-ink-absorbent printing medium include a polyethylene terephthalate (PET) film, a polypropylene (PP) film, a vinyl chloride sheet, glass, and rubber.

<Inkjet Recording Method>

The inkjet recording method according to the present embodiment involves performing recording on a printing medium by discharging a droplet of the above-described ink according to the present embodiment from an inkjet head. The ink nozzle and the like of the inkjet printer that discharges ink are not particularly limited and can be appropriately selected according to the purpose.

The inkjet recording method according to the present embodiment also includes a method of improving resolution of an image by ejecting a large number of inks with a low content of coloring agents in the inks in a small volume; a method of improving resolution of an image by using a plurality of inks having substantially the same hue but different contents of coloring agents in the inks; and a method of improving fixing properties of the coloring agent to a printing medium by using a colorless transparent ink together with an ink containing the coloring agent.

As the inkjet recording method, a known method can be employed. Examples thereof include a charge control method, a drop-on-demand method (also referred to as a pressure pulse method), an acoustic inkjet method, and a thermal inkjet method. Furthermore, the inkjet recording method may be either a multi-pass method or a single-pass method (one pass printing method). In an industrial inkjet printer, single-pass printing using a line-head type inkjet printer is also preferably performed for the purpose of increasing the printing speed. In recent years, circulation heads with a mechanism for preventing the ink from drying in the vicinity of the nozzle by circulating the ink to the vicinity of the nozzle have been extensively developed. The ink according to the present embodiment is also suitably used in such circulation heads.

When recording on a printing medium, for example, a container (ink tank) containing an ink is loaded into a predetermined position of an inkjet printer, and recording is performed on the printing medium by the printing method described above. Full-color printing can also be achieved by loading a container containing each color ink into a predetermined position of an inkjet printer and recording on a printing medium by the printing method described above.

When a printing medium without an ink-receiving layer is used, surface modification treatment is also preferably performed. Examples of the surface modification treatment include corona discharge treatment, plasma treatment, and flame treatment. It is generally known that the effect of the surface modification treatment decreases over time. Therefore, it is preferable to sequentially perform the surface modification treatment step and the inkjet recording step, and it is more preferable to perform the surface modification treatment step right before the inkjet recording step.

For all of the above, combinations of preferred ones are more preferred, and combinations of more preferred ones are even more preferred. The same is true for combinations of preferred and more preferred, combinations of more preferred and even more preferred, and the like.

EXAMPLES

Hereinafter, the present invention will be described in more detail with reference to Examples, but the present invention is not limited thereto.

In Examples, "part" and "%" mean part by mass and % by mass, respectively, unless otherwise specified. When it was necessary to quantify pigment solids in a dispersion liquid, a dry weight method was employed with MS-70 manufactured by A&D Company, Limited. The pigment solids are conversion values obtained by calculating only the pigment solids from the total amount of the solid content.

Preparation Example 1: Preparation of Cyan Dispersion Liquid 1

Synthesis Example 3 in International Publication No. WO 2013/115071 was replicated to obtain a block copolymer. The obtained block copolymer had an acid value of 105 mg KOH/g and a mass average molecular weight of 25000. The obtained block copolymer (6 parts) was dissolved in 2-butanone (30 parts) to form a homogeneous solution. A 28% aqueous ammonia solution (0.68 parts) dissolved in ion-exchanged water (53 parts) was added to this liquid, and the mixture was stirred for an hour to obtain an emulsified liquid. C.I. Pigment Blue 15:4 (Chromofine Blue 4851, manufactured by Dainichiseika Color & Chemicals Mfg. Co., Ltd.) (20 parts) was added to the emulsified liquid, and the mixture was subjected to a dispersion treatment in a sand grinder under a condition of 1500 rpm for 15 hours. Ion-exchanged water (100 parts) was added dropwise to the resulting liquid, and dispersing beads were removed from the mixture by filtration. Then, 2-butanone and part of the water were distilled under reduced pressure with an evaporator to obtain a cyan dispersion liquid 1 with 12% pigment solids.

Preparation Example 2: Preparation of Cyan Dispersion Liquid 2

BYKJET 9151 (manufactured by BYK) (8 parts) was dissolved in ion-exchanged water (72 parts) and stirred for an hour. C.I. Pigment Blue 15:4 (Chromofine Blue 4851, manufactured by Dainichiseika Color & Chemicals Mfg. Co., Ltd.) (20 parts) was added to the resulting solution, and the mixture was subjected to a dispersion treatment in a sand grinder under a condition of 1500 rpm for 15 hours. Ion-exchanged water (70 parts) was added dropwise to the resulting liquid, and the dispersing beads were removed from the mixture by filtration to obtain a cyan dispersion liquid 2 with 11.6% pigment solids.

Preparation Example 3: Preparation of Cyan Dispersion Liquid 3

Joncryl 68 (manufactured by BASF SE, mass average molecular weight: 13000) (9 parts) and triethanolamine (6 parts) were dissolved in ion-exchanged water (75 parts) and stirred for an hour. C.I. Pigment Blue 15:4 (Chromofine Blue 4851, manufactured by Dainichiseika Color & Chemicals Mfg. Co., Ltd.) (30 parts) was added to the resulting solution, and the mixture was subjected to a dispersion treatment in a sand grinder under a condition of 1500 rpm for 15 hours. Ion-exchanged water (40 parts) was added dropwise to the resulting liquid, and dispersing beads were removed from the mixture by filtration to obtain a cyan dispersion liquid 3 with 18.7% pigment solids.

Examples 1 to 27 and Comparative Examples 1 to 12

The cyan dispersion liquids 1 to 3 obtained in Preparation Examples 1 to 3 were each mixed with components listed in Tables 1 to 3 below and then filtered through a membrane filter having a pore size of 3 μm to obtain inks of Examples 1 to 27 and Comparative Examples 1 to 12. The content of the coloring agent in the total mass of the ink was adjusted to 3.5% in each case. The numerical values in the columns of each component in Tables 1 to 3 represent the amount (parts) of the component used, and "-" means that the component was not used.

Details of the resin emulsions in Tables 1 to 3 are as follows:

- A-1127: NeoCryl A-1127 (acrylic resin emulsion, manufactured by DSM Coating Resins Ltd., solid content of 44.0%);
- P5300: HYTEC P-5300 (polypropylene wax emulsion, manufactured by Toho Chemical Industry Co., Ltd., solid content of 30.5%); and
- AQ-515: AQUACER 515 (polyethylene wax emulsion, manufactured by BYK, solid content of 34.6%).

TABLE 1

| | Component | Example 1 | 2 | 3 | 4 | 5 | 6 | 7 |
|---|---|---|---|---|---|---|---|---|
| Coloring agent | Cyan dispersion liquid 1 | 29.2 | 29.2 | 29.2 | 29.2 | 29.2 | 29.2 | 29.2 |
| | Cyan dispersion liquid 2 | — | — | — | — | — | — | — |
| | Cyan dispersion liquid 3 | — | — | — | — | — | — | — |
| Compound a | 1,2-Nonanediol | — | — | — | — | — | — | 0.4 |
| | Diethylene glycol monohexyl ether | 0.5 | 0.5 | 0.5 | 0.5 | 0.5 | 0.8 | — |
| | Ethylene glycol monohexyl ether | — | — | — | — | — | — | — |
| Compound b | 1,7-Heptanediol | — | — | — | — | — | — | — |
| | 1,8-Octanediol | 5.0 | 0.1 | 0.5 | 0.5 | 0.5 | 0.8 | 0.4 |
| | 1,9-Nonanediol | — | — | — | — | — | — | — |
| | 2-Butyl-2-ethyl-1,3-propanediol | — | — | — | — | — | — | — |
| | Ethylene glycol monophenyl ether | — | — | — | — | — | — | — |
| | Ethylene glycol monobenzyl ether | — | — | — | — | — | — | — |
| | Diethylene glycol monophenyl ether | — | — | — | — | — | — | — |
| | Diethylene glycol monobenzyl ether | — | — | — | — | — | — | — |
| Compound c | 1,4-Butanediol | — | — | — | — | — | — | — |
| | 1,5-Pentanediol | 0.5 | 5.0 | 4.0 | 5.0 | 6.0 | 0.4 | 6.3 |
| | 3-Methoxy-3-methyl-1-butanol | — | — | — | — | — | — | — |
| | 3-Methoxy-1-butanol | — | — | — | — | — | — | — |
| | Ethylene glycol monobutyl ether | — | — | — | — | — | — | — |
| | Diethylene glycol monobutyl ether | — | — | — | — | — | — | — |
| Compound d | 1,2-Heptanediol | — | — | — | — | — | — | — |
| | 1,2-Octanediol | — | — | — | — | — | — | — |
| Resin emulsion | A-1127 | — | — | — | — | — | — | — |
| | P5300 | — | — | — | — | — | — | — |
| | AQ-515 | — | — | — | — | — | — | — |
| | Purified water | | | | Balance | | | |
| | Total | 100.0 | 100.0 | 100.0 | 100.0 | 100.0 | 100.0 | 100.0 |

| | Component | Example 8 | 9 | 10 | 11 | 12 | 13 | 14 |
|---|---|---|---|---|---|---|---|---|
| Coloring agent | Cyan dispersion liquid 1 | 29.2 | 29.2 | 29.2 | 29.2 | 29.2 | 29.2 | 29.2 |
| | Cyan dispersion liquid 2 | — | — | — | — | — | — | — |
| | Cyan dispersion liquid 3 | — | — | — | — | — | — | — |
| Compound a | 1,2-Nonanediol | — | — | — | — | — | — | — |
| | Diethylene glycol monohexyl ether | — | 0.5 | 0.5 | 0.5 | 0.5 | 0.5 | 0.5 |
| | Ethylene glycol monohexyl ether | 0.5 | — | — | — | — | — | — |
| Compound b | 1,7-Heptanediol | — | 0.5 | — | — | — | — | — |
| | 1,8-Octanediol | 0.5 | — | — | — | — | — | — |
| | 1,9-Nonanediol | — | — | 0.5 | — | — | — | — |
| | 2-Butyl-2-ethyl-1,3-propanediol | — | — | — | 0.5 | — | — | — |
| | Ethylene glycol monophenyl ether | — | — | — | — | 0.5 | — | — |
| | Ethylene glycol monobenzyl ether | — | — | — | — | — | 0.5 | — |
| | Diethylene glycol monophenyl ether | — | — | — | — | — | — | 0.5 |
| | Diethylene glycol monobenzyl ether | — | — | — | — | — | — | — |
| Compound c | 1,4-Butanediol | — | — | — | — | — | — | — |
| | 1,5-Pentanediol | 5.0 | 5.0 | 5.0 | 7.0 | 5.0 | 5.0 | 5.0 |
| | 3-Methoxy-3-methyl-1-butanol | — | — | — | — | — | — | — |
| | 3-Methoxy-1-butanol | — | — | — | — | — | — | — |
| | Ethylene glycol monobutyl ether | — | — | — | — | — | — | — |
| | Diethylene glycol monobutyl ether | — | — | — | — | — | — | — |
| Compound d | 1,2-Heptanediol | — | — | — | — | — | — | — |
| | 1,2-Octanediol | — | — | — | — | — | — | — |
| Resin emulsion | A-1127 | — | — | — | — | — | — | — |
| | P5300 | — | — | — | — | — | — | — |
| | AQ-515 | — | — | — | — | — | — | — |
| | Purified water | | | | Balance | | | |
| | Total | 100.0 | 100.0 | 100.0 | 100.0 | 100.0 | 100.0 | 100.0 |

TABLE 2

| | Component | Example 15 | 16 | 17 | 18 | 19 | 20 | 21 |
|---|---|---|---|---|---|---|---|---|
| Coloring agent | Cyan dispersion liquid 1 | 29.2 | 29.2 | 29.2 | 29.2 | 29.2 | 29.2 | 29.2 |
| | Cyan dispersion liquid 2 | — | — | — | — | — | — | — |
| | Cyan dispersion liquid 3 | — | — | — | — | — | — | — |
| Compound a | 1,2-Nonanediol | — | — | — | — | — | — | — |
| | Diethylene glycol monohexyl ether | 0.5 | 0.5 | 0.5 | 0.5 | 0.5 | 0.5 | — |
| | Ethylene glycol monohexyl ether | — | — | — | — | — | — | — |
| Compound b | 1,7-Heptanediol | — | — | — | — | — | — | — |
| | 1,8-Octanediol | — | 0.5 | 0.5 | 0.5 | 0.5 | 0.5 | — |
| | 1,9-Nonanediol | — | — | — | — | — | — | — |
| | 2-Butyl-2-ethyl-1,3-propanediol | — | — | — | — | — | — | — |
| | Ethylene glycol monophenyl ether | — | — | — | — | — | — | — |
| | Ethylene glycol monobenzyl ether | — | — | — | — | — | — | — |
| | Diethylene glycol monophenyl ether | — | — | — | — | — | — | — |
| | Diethylene glycol monobenzyl ether | 0.5 | — | — | — | — | — | — |
| Compound c | 1,4-Butanediol | — | 5.0 | — | — | — | — | — |
| | 1,5-Pentanediol | 5.0 | — | — | — | — | — | 5.0 |
| | 3-Methoxy-3-methyl-1-butanol | — | — | 5.0 | — | — | — | — |
| | 3-Methoxy-1-butanol | — | — | — | 5.0 | — | — | — |
| | Ethylene glycol monobutyl ether | — | — | — | — | 5.0 | — | — |
| | Diethylene glycol monobutyl ether | — | — | — | — | — | 5.0 | — |
| Compound d | 1,2-Heptanediol | — | — | — | — | — | — | 1.0 |
| | 1,2-Octanediol | — | — | — | — | — | — | — |
| Resin emulsion | A-1127 | — | — | — | — | — | — | — |
| | P5300 | — | — | — | — | — | — | — |
| | AQ-515 | — | — | — | — | — | — | — |
| | Purified water | Balance | | | | | | |
| | Total | 100.0 | 100.0 | 100.0 | 100.0 | 100.0 | 100.0 | 100.0 |

| | Component | Example 22 | 23 | 24 | 25 | 26 | 27 |
|---|---|---|---|---|---|---|---|
| Coloring agent | Cyan dispersion liquid 1 | 29.2 | — | — | — | — | — |
| | Cyan dispersion liquid 2 | — | 30.1 | — | — | — | — |
| | Cyan dispersion liquid 3 | — | — | 18.7 | 18.7 | 18.7 | 18.7 |
| Compound a | 1,2-Nonanediol | — | — | — | — | — | — |
| | Diethylene glycol monohexyl ether | — | 0.5 | 0.5 | 0.5 | 0.5 | 0.5 |
| | Ethylene glycol monohexyl ether | — | — | — | — | — | — |
| Compound b | 1,7-Heptanediol | — | — | — | — | — | — |
| | 1,8-Octanediol | — | 0.5 | 0.5 | 0.5 | 0.5 | 0.5 |
| | 1,9-Nonanediol | — | — | — | — | — | — |
| | 2-Butyl-2-ethyl-1,3-propanediol | — | — | — | — | — | — |
| | Ethylene glycol monophenyl ether | — | — | — | — | — | — |
| | Ethylene glycol monobenzyl ether | — | — | — | — | — | — |
| | Diethylene glycol monophenyl ether | — | — | — | — | — | — |
| | Diethylene glycol monobenzyl ether | — | — | — | — | — | — |
| Compound c | 1,4-Butanediol | — | — | — | — | — | — |
| | 1,5-Pentanediol | 5.0 | 5.0 | 5.0 | 5.0 | 5.0 | 5.0 |
| | 3-Methoxy-3-methyl-1-butanol | — | — | — | — | — | — |
| | 3-Methoxy-1-butanol | — | — | — | — | — | — |
| | Ethylene glycol monobutyl ether | — | — | — | — | — | — |
| | Diethylene glycol monobutyl ether | — | — | — | — | — | — |
| Compound d | 1,2-Heptanediol | — | — | — | — | — | — |
| | 1,2-Octanediol | 0.5 | — | — | — | — | — |
| Resin emulsion | A-1127 | — | — | — | 25.9 | — | — |
| | P5300 | — | — | — | — | 53.7 | — |
| | AQ-515 | — | — | — | — | — | 41.9 |
| | Purified water | Balance | | | | | |
| | Total | 100.0 | 100.0 | 100.0 | 100.0 | 100.0 | 100.0 |

TABLE 3

| | Component | Comparative Example 1 | 2 | 3 | 4 | 5 | 6 |
|---|---|---|---|---|---|---|---|
| Coloring agent | Cyan dispersion liquid 1 | 29.2 | 29.2 | 29.2 | 29.2 | 29.2 | 29.2 |
| | Cyan dispersion liquid 2 | — | — | — | — | — | — |
| | Cyan dispersion liquid 3 | — | — | — | — | — | — |

TABLE 3-continued

|  |  | | | | | | |
|---|---|---|---|---|---|---|---|
| Compound a | 1,2-Nonanediol | — | — | — | — | — | — |
|  | Diethylene glycol monohexyl ether | — | 1.0 | — | — | — | 1.0 |
|  | Ethylene glycol monohexyl ether | — | — | — | — | — | — |
| Compound b | 1,7-Heptanediol | — | — | — | — | — | — |
|  | 1,8-Octanediol | — | — | 1.0 | — | — | 1.0 |
|  | 1,9-Nonanediol | — | — | — | — | — | — |
|  | 2-Butyl-2-ethyl-1,3-propanediol | — | — | — | — | — | — |
|  | Ethylene glycol monophenyl ether | — | — | — | — | — | — |
|  | Ethylene glycol monobenzyl ether | — | — | — | — | — | — |
|  | Diethylene glycol monophenyl ether | — | — | — | — | — | — |
|  | Diethylene glycol monobenzyl ether | — | — | — | — | — | — |
| Compound c | 1,4-Butanediol | — | — | — | — | — | — |
|  | 1,5-Pentanediol | — | — | — | 8.0 | — | — |
|  | 3-Methoxy-3-methyl-1-butanol | — | — | — | — | — | — |
|  | 3-Methoxy-1-butanol | — | — | — | — | — | — |
|  | Ethylene glycol monobutyl ether | — | — | — | — | — | — |
|  | Diethylene glycol monobutyl ether | — | — | — | — | — | — |
| Compound d | 1,2-Heptanediol | — | — | — | — | 1.3 | — |
|  | 1,2-Octanediol | — | — | — | — | — | — |
| Resin emulsion | A-1127 | — | — | — | — | — | — |
|  | P5300 | — | — | — | — | — | — |
|  | AQ-515 | — | — | — | — | — | — |
|  | Purified water | Balance | | | | | |
|  | Total | 100.0 | 100.0 | 100.0 | 100.0 | 100.0 | 100.0 |

|  |  | Comparative Example | | | | | |
|---|---|---|---|---|---|---|---|
|  | Component | 7 | 8 | 9 | 10 | 11 | 12 |
| Coloring agent | Cyan dispersion liquid 1 | 29.2 | 29.2 | 29.2 | 29.2 | 29.2 | 29.2 |
|  | Cyan dispersion liquid 2 | — | — | — | — | — | — |
|  | Cyan dispersion liquid 3 | — | — | — | — | — | — |
| Compound a | 1,2-Nonanediol | — | — | — | — | — | — |
|  | Diethylene glycol monohexyl ether | 1.0 | — | 0.5 | 0.4 | — | — |
|  | Ethylene glycol monohexyl ether | — | — | — | — | — | — |
| Compound b | 1,7-Heptanediol | — | — | — | — | — | — |
|  | 1,8-Octanediol | — | 1.0 | 0.1 | 0.4 | — | — |
|  | 1,9-Nonanediol | — | — | — | — | — | — |
|  | 2-Butyl-2-ethyl-1,3-propanediol | — | — | — | — | — | — |
|  | Ethylene glycol monophenyl ether | — | — | — | — | — | — |
|  | Ethylene glycol monobenzyl ether | — | — | — | — | — | — |
|  | Diethylene glycol monophenyl ether | — | — | — | — | — | — |
|  | Diethylene glycol monobenzyl ether | — | — | — | — | — | — |
| Compound c | 1,4-Butanediol | — | — | — | — | — | — |
|  | 1,5-Pentanediol | 8.0 | 8.0 | 10.0 | 0.2 | 5.0 | 5.0 |
|  | 3-Methoxy-3-methyl-1-butanol | — | — | — | — | — | — |
|  | 3-Methoxy-1-butanol | — | — | — | — | — | — |
|  | Ethylene glycol monobutyl ether | — | — | — | — | — | — |
|  | Diethylene glycol monobutyl ether | — | — | — | — | — | — |
| Compound d | 1,2-Heptanediol | — | — | — | — | 5.0 | 0.3 |
|  | 1,2-Octanediol | — | — | — | — | — | — |
| Resin emulsion | A-1127 | — | — | — | — | — | — |
|  | P5300 | — | — | — | — | — | — |
|  | AQ-515 | — | — | — | — | — | — |
|  | Purified water | Balance | | | | | |
|  | Total | 100.0 | 100.0 | 100.0 | 100.0 | 100.0 | 100.0 |

<Evaluation>
[Evaluation of Compatibility]

Mixed liquids containing materials other than the cyan dispersion liquid among the compositions of Examples 1 to 27 and Comparative Examples 1 to 12 were prepared, and the compatibility of the mixed liquids was evaluated. The results are shown in Tables 4 to 6 below. Since insufficient compatibility reduces the homogeneity of the ink and prevents the effect of wettability from being sufficiently realized, the following evaluation criteria are preferably A for practical use.

—Criteria for Evaluation of Compatibility—
A: Homogeneous and completely mixed
B: No oil droplets on the liquid surface, but suspended and not completely dissolved
C: Oil droplets being floating on the surface of the mixed liquid, and not completely dissolved
D: Components in the mixed liquid being separated and not dissolved at all

[Measurement of Contact Angle]

A PET film (E5102, manufactured by Toyobo Co., Ltd.) was used as a substrate, and a contact angle between each of the inks obtained above and the PET film was measured. The evaluation was made according to the following evaluation criteria. Specifically, DM-501 Hi (manufactured by Kyowa Interface Science Co., Ltd.) was used as a contact angle meter to measure a contact angle at 25° C. 10 seconds after ink landing with a droplet amount of 2 μL. The results are shown in Tables 4 to 6 below. Since a lower numerical value of the contact angle means that the ink wets and spreads well on the PET film, the following evaluation criteria are preferably B or higher for practical use. In Table 6 below, "-" indicates that the ink material was not mixed, and thus evaluation of the ink was impossible.

—Criteria for Evaluation of Contact Angle—
- A: Contact angle ≤ 15°
- B: 15° < contact angle ≤ 20°
- C: 20° < contact angle ≤ 30°
- D: 30° < contact angle

[Evaluation of Drying Property]

A PET film (E5102, manufactured by Toyobo Co., Ltd.) was used as a substrate, and each of the inks obtained above was added dropwise in an amount of 20 μL with a micropipette and allowed to stand under a condition of 70° C. The film was removed every 5 minutes, and another fresh PET film was gently placed on top of the PET film with the ink droplets and allowed to stand for 10 seconds before being peeled off. In this process, it was confirmed whether the ink was transferred to the overlaid PET film, and the drying time was defined as time during which the film remained under a condition of 70° C. when no transfer occurred. The evaluation was made according to the following evaluation criteria. The results are shown in Tables 4 to 6 below. The following evaluation criteria are preferably B or higher for practical use. In Table 6 below, "—" indicates that the ink material was not mixed, and thus evaluation of the ink was impossible.

—Criteria for Evaluation of Drying Property—
- A: Drying time ≤ 15 minutes
- B: 15 minutes < drying time ≤ 30 minutes
- C: 30 minutes < drying time ≤ 60 minutes
- D: 60 minutes < drying time

TABLE 4

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Compatibility | A | A | A | A | A | A | A | A | A | A | A | A | A | A |
| Contact angle | A | B | A | A | A | A | A | A | A | A | A | A | A | A |
| Drying property | A | A | A | A | A | A | A | A | A | A | A | A | A | A |

TABLE 5

| | Example | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 |
| Compatibility | A | A | A | A | A | A | A | A | A | A | A | A | A |
| Contact angle | A | A | A | A | A | A | A | A | A | A | A | B | B |
| Drying property | A | A | A | A | A | A | A | A | A | A | A | A | A |

TABLE 6

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compatibility | A | C | A | A | D | D | A | A | A | A | D | A |
| Contact angle | D | — | D | D | — | — | C | D | C | D | — | D |
| Drying property | A | — | A | C | — | — | C | C | D | A | — | B |

As shown in Tables 4 to 6 above, the inks of Examples 1 to 27 were superior to the inks of Comparative Examples 1 to 12 in terms of wettability to the PET film and were equivalent to or better than the inks of Comparative Examples 1 to 12 in terms of compatibility and drying properties. The results indicate that the inks of Examples 1 to 27 are excellent inks having all of compatibility, wettability, and drying properties.

The invention claimed is:

1. An inkjet ink comprising a coloring agent, an organic compound excluding the coloring agent, and water, wherein the organic compound satisfies condition (A) or (B) below:

(A) the organic compound comprises:
- a compound a: at least one compound selected from a compound represented by formula (1) below and a compound represented by formula (2) below;
- a compound b: at least one compound selected from a compound represented by formula (3) below and a compound represented by formula (4) below; and
- a compound c: at least one compound selected from the group consisting of C4-C5 alkanediol, a compound represented by formula (5) below, and a compound represented by formula (6) below, wherein relationships of (a)≤(c) and 0.1≤(c)/(b)≤50 are satisfied, when (a) represents, in parts by mass, a total contained amount of the compound a with respect to 100 parts by mass of the inkjet ink, (b) represents, in parts by mass, a total contained amount of the compound b with respect to 100 parts by mass of the inkjet ink, and (c) represents, in parts by mass, a total contained amount of the compound c with respect to 100 parts by mass of the inkjet ink; or (B) the organic compound comprises:
- a compound a: at least one compound selected from a compound represented by formula (1) below and a compound represented by formula (2) below;
- a compound b: at least one compound selected from a compound represented by formula (3) below and a compound represented by formula (4) below; and
- a compound c: at least one compound selected from the group consisting of C4-C5 alkanediol, a compound represented by formula (5) below, and a compound represented by formula (6) below, wherein (a) is greater than 0.4, and a relationship of (a) > (c) is satisfied, when (a) represents, in parts by mass, the total contained amount of the compound a with respect to 100 parts by mass of the inkjet ink, and (c) represents, in parts by mass, the total contained amount of the compound c with respect to 100 parts by mass of the inkjet ink:

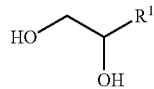   (1)

wherein $R^1$ represents a linear or branched C5-C10 hydrocarbon group,

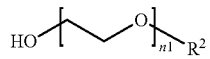   (2)

wherein $R^2$ represents a linear or branched C6-C7 hydrocarbon group, and n1 represents 1 or 2,

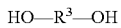   (3)

wherein $R^3$ represents a linear C7-C12 hydrocarbon group,

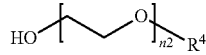   (4)

wherein $R^4$ represents a phenyl group or a benzyl group, and n2 represents 1 or 2,

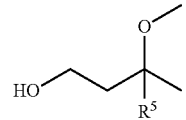   (5)

wherein $R^5$ represents a hydrogen atom or a methyl group, and

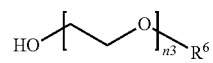   (6)

wherein $R^6$ represents a linear or branched C1-C4 hydrocarbon group, and n3 represents 1 or 2.

2. The inkjet ink according to claim 1, wherein the organic compound satisfies the condition (A) and a relationship of $1< (c)/(b) \leq 50$ is satisfied.

3. The inkjet ink according to claim 1, wherein the coloring agent comprises at least one selected from the group consisting of a pigment and a disperse dye.

4. An inkjet recording method, comprising discharging a droplet of the inkjet ink according to claim 1 from an inkjet head to perform recording on a printing medium.

5. The inkjet recording method according to claim 4, wherein the printing medium is a less ink-absorbent or non-ink-absorbent printing medium.

6. The inkjet recording method according to claim 4, wherein the inkjet head comprises a circulation mechanism.

7. An ink set comprising: the inkjet ink according to claim 1; and an additional inkjet ink different from the inkjet ink.

8. An ink and medium set comprising: the inkjet ink according to claim 1 and a printing medium.

9. A printed medium to which the inkjet ink according to claim 1 has adhered.

* * * * *